United States Patent
Gill et al.

(10) Patent No.: US 11,831,768 B2
(45) Date of Patent: *Nov. 28, 2023

(54) CRYPTOGRAPHIC MATERIAL SHARING AMONG ENTITIES WITH NO DIRECT TRUST RELATIONSHIP OR CONNECTIVITY

(71) Applicant: Akamai Technologies, Inc., Cambridge, MA (US)

(72) Inventors: Rupinder Gill, Sunnyvale, CA (US); Punit Kandoi, Sunnyvale, CA (US); Venukrishna Prasad, Sunnyvale, CA (US); Seetharama Ayyadevara, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/201,260

(22) Filed: Mar. 15, 2021

(65) Prior Publication Data
US 2021/0203500 A1    Jul. 1, 2021

Related U.S. Application Data

(63) Continuation of application No. 15/661,092, filed on Jul. 27, 2017, now Pat. No. 10,951,407.

(60) Provisional application No. 62/367,215, filed on Jul. 27, 2016.

(51) Int. Cl.
*H04L 9/08*    (2006.01)
*H04L 9/12*    (2006.01)
*H04L 9/30*    (2006.01)
*H04L 9/40*    (2022.01)

(52) U.S. Cl.
CPC ............... *H04L 9/12* (2013.01); *H04L 9/083* (2013.01); *H04L 9/30* (2013.01); *H04L 63/0442* (2013.01)

(58) Field of Classification Search
CPC ... H04L 9/12; H04L 9/083; H04L 9/30; H04L 63/0442
See application file for complete search history.

(56) References Cited

U.S. PATENT DOCUMENTS

| | | | | |
|---|---|---|---|---|
| 7,421,578 B1* | 9/2008 | Huang | .................. | H04L 63/065 370/254 |
| 8,458,462 B1* | 6/2013 | Hanna | .................... | H04L 63/10 726/10 |
| 10,778,429 B1* | 9/2020 | Rubin | .................. | H04L 9/0877 |
| 2009/0259612 A1* | 10/2009 | Hanson | ................... | H04L 69/22 706/47 |
| 2010/0223458 A1* | 9/2010 | McGrew | ............... | H04L 9/0833 713/153 |
| 2012/0254342 A1* | 10/2012 | Evans | ................. | G06F 11/2064 709/214 |

(Continued)

*Primary Examiner* — Catherine Thiaw
(74) *Attorney, Agent, or Firm* — David H. Judson

(57) ABSTRACT

A mechanism to share cryptographic material across entities that may not have a direct trust relationship between or among each other, or no network connectivity, or some combination thereof, but where participating entities do share a trust relationship (or trusted connection(s)) with a common entity, sometimes referred to herein as a "conduit" entity. This technique enables such entities to leverage their trust relationship with a common "conduit" entity to share cryptographic material between or among themselves.

10 Claims, 5 Drawing Sheets

(56) References Cited

U.S. PATENT DOCUMENTS

| | | | |
|---|---|---|---|
| 2012/0271795 A1* | 10/2012 | Rao | G06F 16/27 |
| | | | 707/613 |
| 2016/0315923 A1* | 10/2016 | Riscombe-Burton | |
| | | | H04L 63/0442 |
| 2017/0295226 A1* | 10/2017 | Basta | H04L 67/141 |
| 2017/0366619 A1* | 12/2017 | Schreter | H04L 67/10 |

* cited by examiner

CRYPTOGRAPHIC MATERIAL SHARING AMONG ENTITIES WITH NO DIRECT TRUST RELATIONSHIP OR CONNECTIVITY

BACKGROUND

Technical Field

This application relates generally to managing cryptographic material across a set of computing resources in a distributed network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Overlay networks of the type described above often implement the notion of leader election. An example scenario is U.S. Pat. No. 6,751,673, which is commonly-owned. In distributed computing, conventionally leader election is the process of designating a single process as the organizer of some task distributed among several computers (nodes). Before the task is begun, all network nodes either are unaware which node will serve as the "leader" (or coordinator) of the task, or they are unable to communicate with the current coordinator. After a leader election algorithm has been run, however, each node throughout the network recognizes a particular, unique node as the task leader. To this end, the network nodes communicate among themselves to decide which of them will become the leader.

A network entity might want to share cryptographic material with other entities without explicit pre-established trust relationship or communication path between or among each other. This requirement might be driven by a logical relationship between these entities, such as belonging to the same customer or an administrative domain, or the like.

BRIEF SUMMARY

This disclosure describes a mechanism to share cryptographic material across computing entities that may not have a direct trust relationship between or among each other, or no network connectivity, or some combination thereof, but where participating entities do share a trust relationship (or trusted connection(s)) with a common entity, sometimes referred to herein as a "conduit" entity. This technique enables such entities to leverage their trust relationship with a common "conduit" entity to share cryptographic material between or among themselves.

In one embodiment, a method of sharing cryptographic material among a set of computing entities is described. In this embodiment, given computing entities do not share a direct trust relationship or connectivity with one another. The method is carried out at a conduit entity with which each of the set of computing entities shares a trusted communication path. It begins by storing an indication that identifies a given one of the computing entities as a leader entity. The cryptographic material to be shared is material that has been generated by the leader entity. A value representing a synchronization state is also stored, and preferably this value also is generated by the leader entity and, in particular, by applying a given function to the cryptographic material. Thereafter, the conduit entity receives a message from a computing entity that is not the leader entity. In response, a determination is made whether the computing entity has the cryptographic material. When it is determined that the computing entity does not have the cryptographic material, a synchronization protocol is then initiated among the computing entity, the conduit entity and the leader entity to attempt to provide the cryptographic material from the leader entity to the computing entity via the conduit entity.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
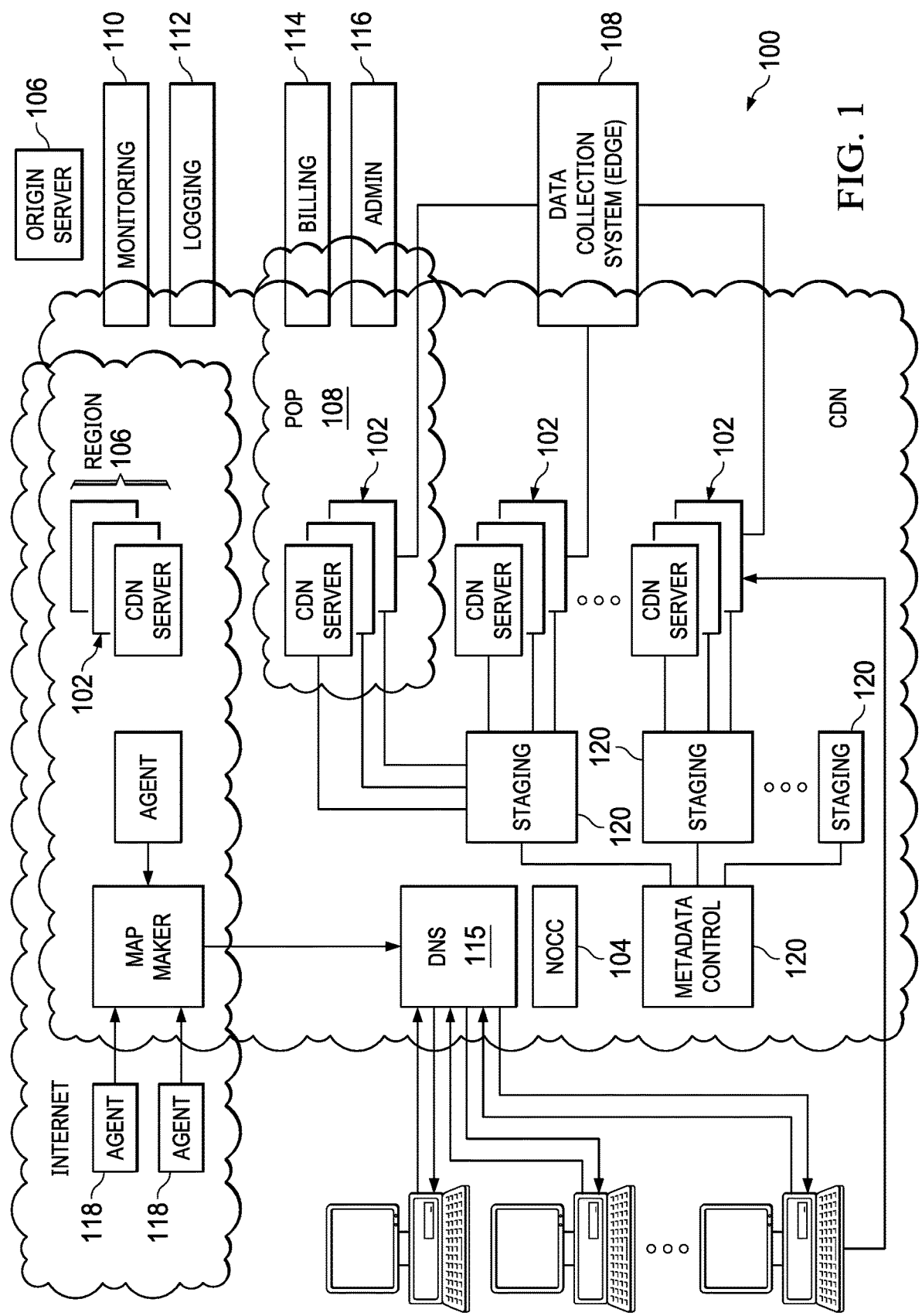
FIG. 1 is a block diagram illustrating a known distributed computer system configured as a content delivery network (CDN)

The techniques of this disclosure may be implemented within the context of an overlay network, such as a content delivery network (CDN), although this is not a limitation. In a known system of this type, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
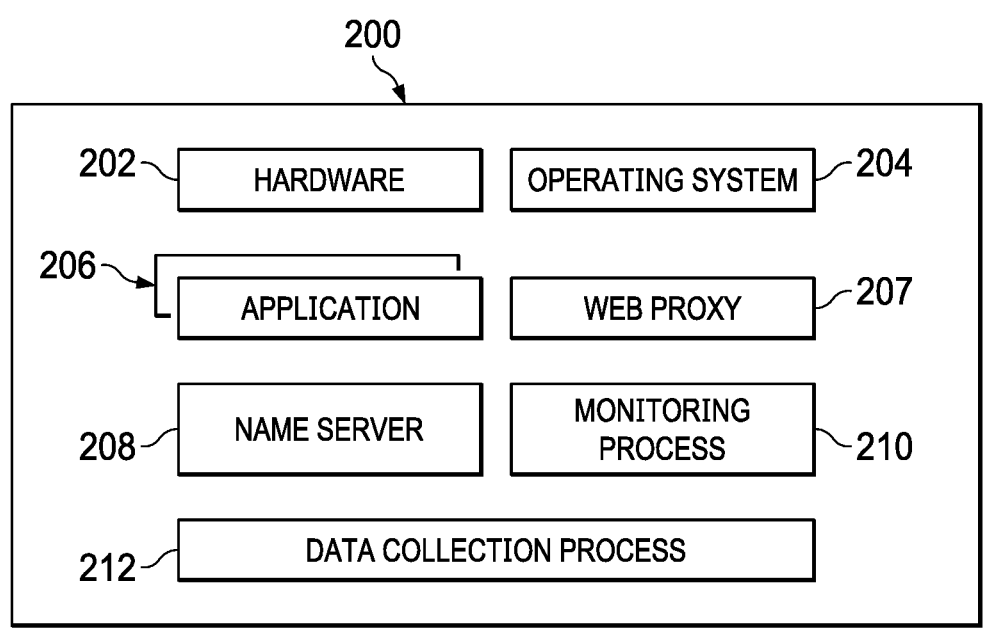
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Communications across various components of the overlay network may be secured via TLS. Transport Layer Security (TLS) and its predecessor, Secure Sockets Layer (SSL), are cryptographic protocols that provide Internet communication security. They use asymmetric cryptography for authentication and key exchange, symmetric encryption for confidentiality, and message authentication codes for message integrity. TLS/SSL is initialized at a session layer then works at a presentation layer. In particular, first the session layer has a handshake using an asymmetric cipher to establish cipher settings and a shared key for that session. Thereafter, a presentation layer encrypts the rest of the communication using a symmetric cipher and that session key. In both models, TLS and SSL work on behalf of the underlying transport layer, whose segments carry encrypted data. TLS is an IETF standards track protocol, defined in RFC 5246 and RFC 6176.

Sharing Cryptographic Material Among Entities

The subject matter herein describes a mechanism to share cryptographic material across computing entities that need not have any direct trust relationship between each other (and possibly no network connectivity), but that share a trust relationship with a common conduit entity. This technique enables such entities to leverage their trust relationship with the common conduit entity to share cryptographic material between or among themselves.

Figure 3:
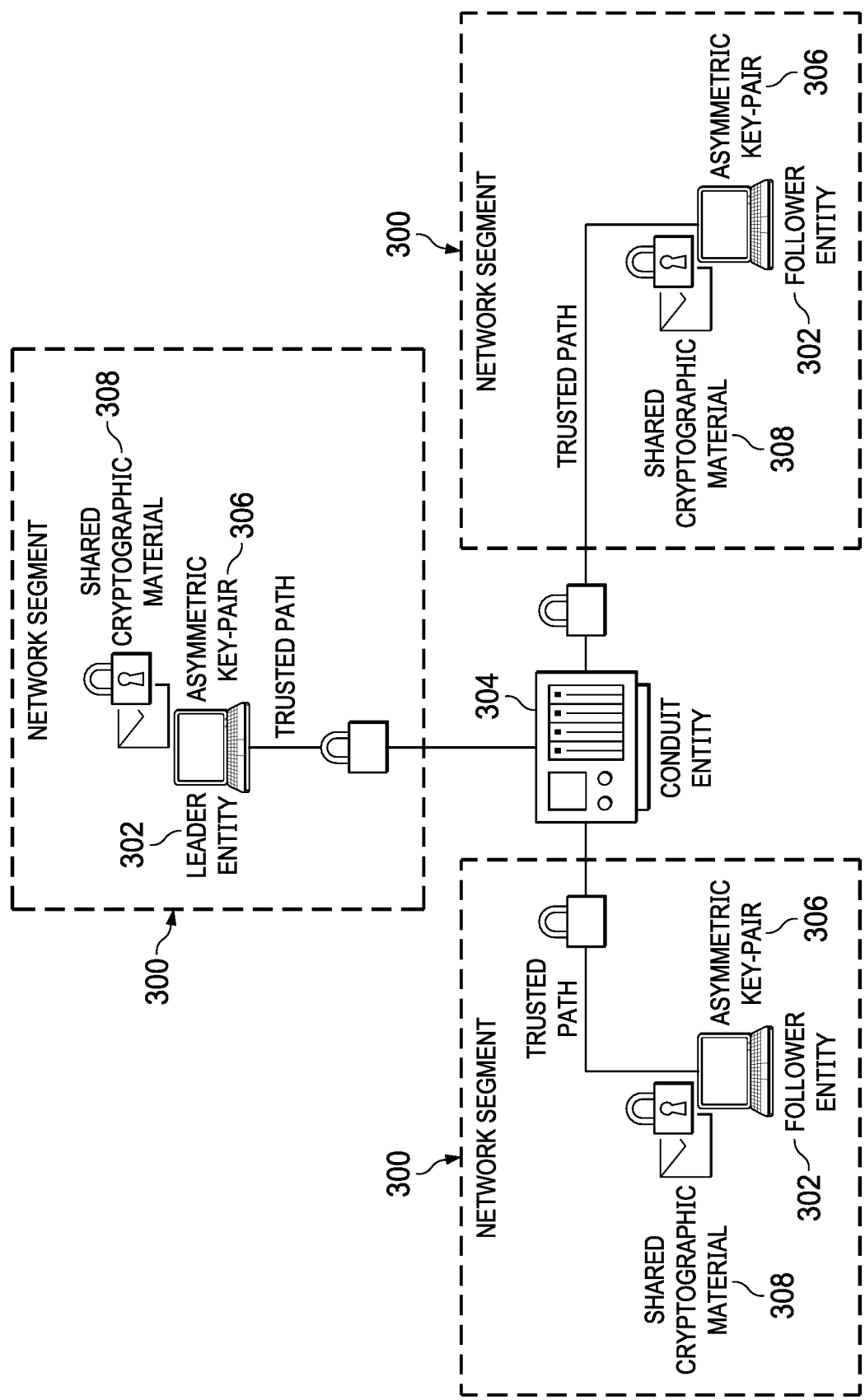
FIG. 3 depicts a network environment in which the technique of this disclosure may be implemented.

FIG. 3 depicts a representative embodiment in which the techniques of this disclosure may be practiced. In the example embodiment, which is not intended to be limited, there are three (3) network segments 300, each of which includes a computing entity 302. The number of segments and entities of course is merely illustrative. One of the computing entities 302 is designated the leader entity, while the other computing entities are each designated as a follower entity. These entities share a common trusted entity, in this case a computing entity 304 that is designated as a conduit entity. Each of the computing entities 302 is coupled to the conduit entity 304 via a trusted path. Preferably, although without limitation, the trusted paths are established using mutually-authenticated Transport Layer Security (TLS) with asymmetric cryptographic key pairs.

Typically, the leader and follower entities as depicted have no direct trust relationship with one another, or even any direct communication path between each other. Rather, these entities merely share the common conduit entity with which they each have established trusted paths as depicted. According to this disclosure, and as will be described, the subject matter herein provides a technique to enable these entities to share cryptographic material 308 using the common entity. More generally, the computing entities (e.g., entities 302 in FIG. 3) that desire to share cryptographic material among themselves are sometimes referred to herein as target entities, as they are the "targets" of the sharing. Target entities are those that might share a logical relationship (such as, belonging to the same customer, the same domain, or the like), or some other relationship. Preferably, and as depicted in FIG. 3, each target (computing) entity has an asymmetric key-pair 306. As is well-known, a key pair of this type typically comprises a public key (designed to be made public), together with an associated private key (designed to be maintained private). Public key cryptographic schemes based on such key pairs are well-known. In some embodiments, these can be RSA 2048 bit key-pairs. The cryptographic material to be shared across these target entities can be any secret material, e.g., a key, a key pair, ion algorithm (or identifier), a salt, the result of applying a function to some data or information, a key share, context information, or the like. In some embodiments, this cryptographic material is an Elliptic Curve (ECC) key pair for asymmetric cryptography.

Preferably, cryptographic material to be shared across target entities is generated directly on one of the target entities. Then, and using the sharing protocol described below, the cryptographic material is distributed to one or more other target entities via the conduit entity 304. In this example scenario, the cryptographic material to be shared is generated on the computing entity designated as the leader entity, and that material is then shared with each of the follower entities. As will be seen, the target entities are kept in synchronization dynamically such that they have exactly the same cryptographic material, preferably at all relevant times. This synchronization is driven by the conduit entity, and failure of one or more target entities does not affect the synchronization mechanism. Also, a further feature of the sharing protocol is that cryptographic material (that is being shared between or among target entities) is protected from view even with respect to the conduit entity, typically by using a public key of a target entity that is the intended recipient of that information. Thus, preferably the conduit entity 304 does not get unprotected access to the cryptographic material that is being shared.

Referring back to FIG. 3, preferably each target entity 302 that is willing to participate in cryptographic material sharing according to this protocol periodically sends a message to the conduit entity. A preferred form of the message is a "fingerprint" of the target entity's copy of the cryptographic material itself. In the embodiment described below, the periodic message is referred to as the fingerprint message (shown here as "Fingerprint_Msg"), and a convenient way to generate this message is simply for the target entity to compute a cryptographic hash (e.g., using SHA-256) over the material. As will be described, this message is used for leader election (if no leader entity has already been selected), and for synchronization of cryptographic material across the target entities that desire to share that cryptographic material according to the protocol.

Cryptographic Material Generation and Leader Election

Figure 4:
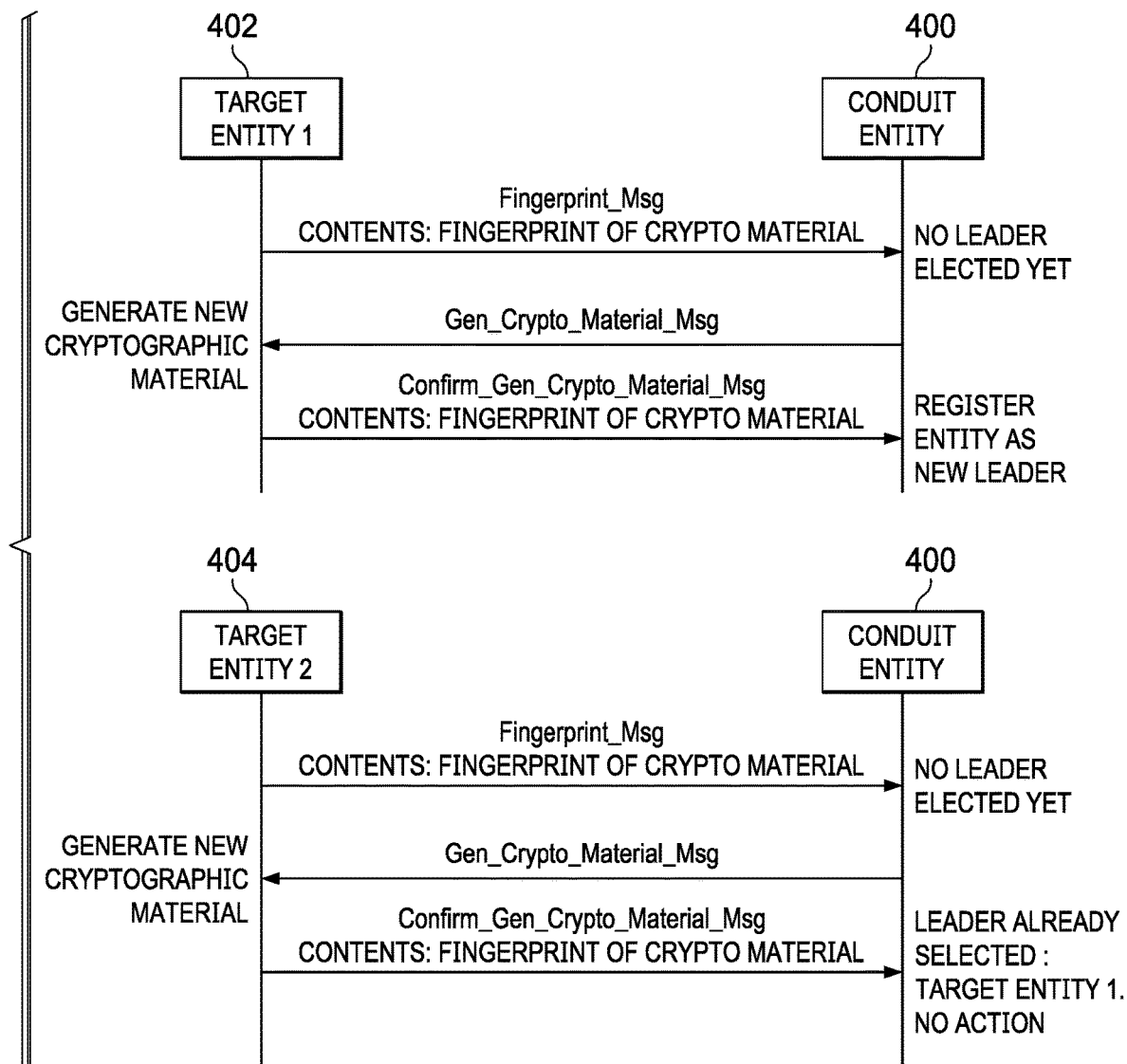
FIG. 4 depicts representative message flow(s) for leader election and shared cryptographic material generation according to this disclosure.

Preferably, the conduct entity facilitates election of a leader entity from amongst the target entities. According to the protocol, the generation of the cryptographic material to be shared among the target entities occurs on the leader entity only. Leader election preferably is initiated and facilitated by the conduit entity, typically as depicted in FIG. 4. In this example scenario, there are two target entities ("target entity 1" 402, and "target entity 2" 404). The interaction of each target entity with the conduit entity 400 is depicted as shown.

To this end, and upon receipt of the Fingerprint_Msg from a target entity (in the example target entity 402), the conduit entity 400 check to see if a leader has already been selected. If there is no leader, then the conduit entity sends an invitation to the requesting target entity 402 to invite that entity to generate cryptographic material and thus become the leader. This message is referred to as the generate cryptographic material message (the "Gen_Crypt_Material_Msg"). Multiple entities may receive this invitation while no leader has yet been selected. In this drawing, both of the target entities 402 and 404 have been invited to respond to the invitation from the conduit entity, and it is assumed for purposes of illustration that target entity 1 responds before target entity 2. More generally, the target entity that first confirms (to the conduit entity) successful generation of the cryptographic material to be shared gets elected as leader. Typically, the confirmation that the target entity has generated the cryptographic material successfully is provided by a cryptographic material generation confirmation message (depicted herein as "Confirm_Gen_Crypto_Material_Msg") that is then delivered to the conduit entity (in this case by target entity 1). In response, the conduit entity 400 marks that target entity 402 as the leader, and it registers the fingerprint sent by target entity 1 (the new leader) as a desired state for the synchronization (the sharing) protocol. As also depicted in the bottom half of the drawing, the target entity 404 also responds with the confirmation message (if it can generate the new cryptographic material successfully), but in this case the conduit entity takes no action in response to the receipt from target entity 404 of the Confirm_Gen_Crypto_Material_Msg because target entity 402 is already selected as the leader.

Cryptographic Material Synchronization Protocol

As noted generally above, the aim of the cryptographic material synchronization protocol of this disclosure is to securely distribute the cryptographic material generated by the leader entity to the one or more target (follower) entities. The follower entities are also sometimes referred to herein as non-leader target entities. The protocol that is now described ensures that the follower entities obtain the cryptographic material that the leader entity generated. As noted above, a goal of the protocol is to ensure that all of the target entities (leader, and the one or more followers) have a consistent view of the cryptographic material that is desired to be shared according to the protocol.

Figure 5:
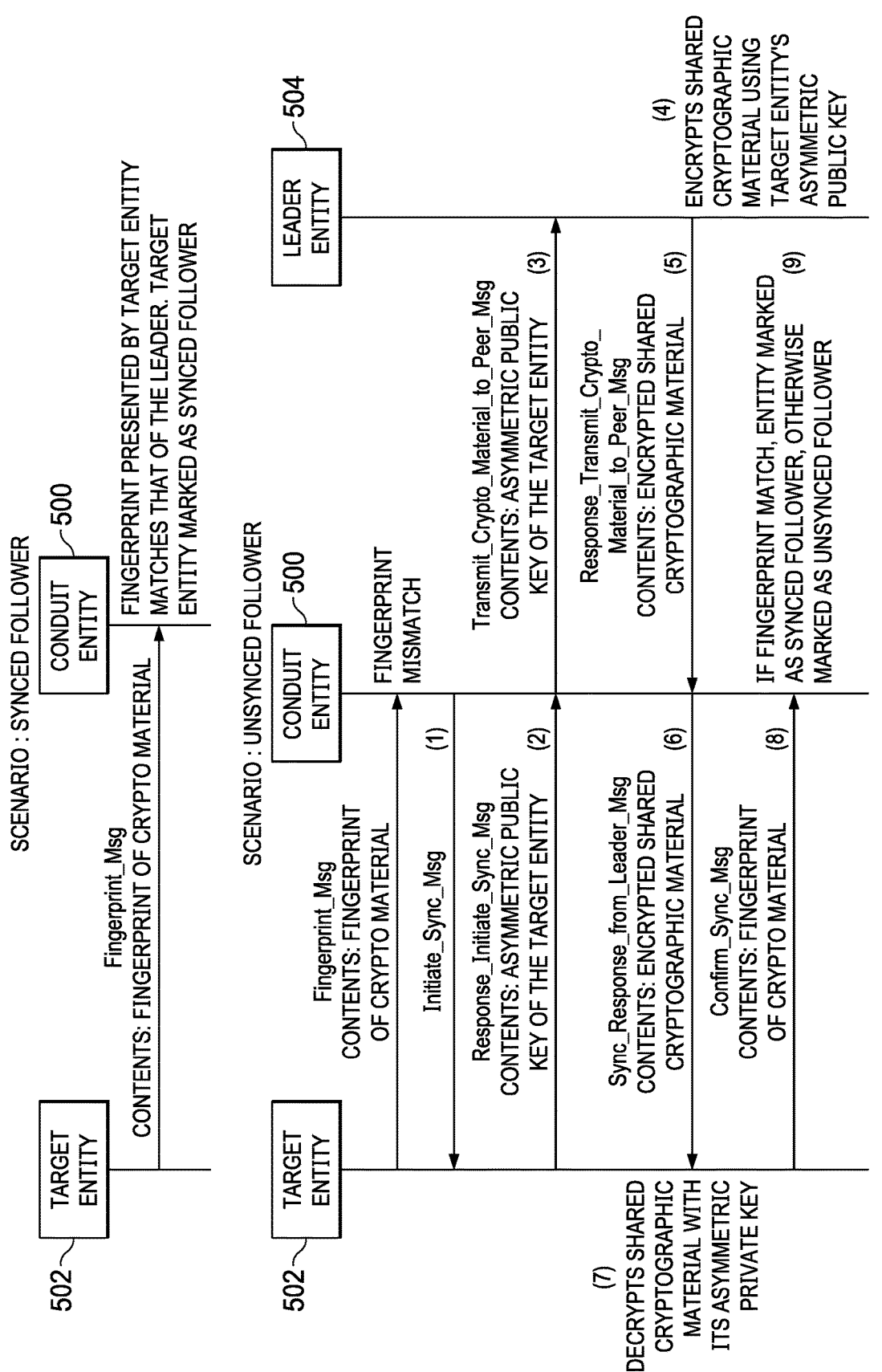
FIG. 5 depicts a preferred cryptographic material synchronization protocol of this disclosure.

An embodiment of the cryptographic material synchronization protocol of this disclosure is depicted in FIG. 5. In this drawing, there are two possible scenarios shown. The first (upper portion) scenario is when the target entity 502 is a follower that is already synchronized (a sync-ed follower) with the leader 504; the second (lower portion) scenario is when the target entity 502 is not yet synchronized (an unsync-ed follower). As noted previously, the conduit entity 500 enables the target(s) to obtain the cryptographic material generated by the leader entity 504.

When the conduit entity 500 receives a periodic Fingerprint_Msg from any target entity, the following operations are carried out. The conduit entity 500 first checks to see if a leader has already been elect. If so, then a comparison is made between the fingerprint presented by the target entity and the fingerprint registered for the leader. If no leader has been elected, then the leader election protocol is carried out (as previously described). If, however, the fingerprints match, then the target entity 502 is declared a "Synched Follower" and no further action is taken. This is the upper portion of the drawing.

The bottom portion of the drawing depicts the steps of the synchronization protocol initiated by the conduct entity 500, e.g., when the fingerprints do not match. At step (1), the conduit entity 500 sends an initiate synchronization message ("Initiate_Sync_Msg") to the target entity 502 that sent the mismatched Fingerprint_Msg. On receipt of the Initiate_Sync_Msg message, at step (2) the target entity 502 sends back a message to the conduit entity 500. Preferably, that message ("Response_Initiate_Sync_Msg") contains the target entity's asymmetric public key, and that key may be an RSA 2048-bit public key. At step (3), the conduit entity 500 responds to leader entity 504 a so-called transmit cryptographic material to peer(s) message ("Transmit_Crypto_Material_To_Peer_Msg").

On receipt of the Transmit_Crypto_Material_To_Peer_Msg message, and, at step (4), the leader responds by encrypting the cryptographic material to be shared, using the target entity's public key. This encrypted content (the material being shared) is then sent from the leader entity back to the conduit entity in an appropriate response message, namely "Response_Transmit_Crypto_Material_To_Peer_Msg." This is step (5). Then, and at step (6), the conduit entity 500, having received that response from the leader, sends the received encrypted cryptographic material to the target entity, preferably in a message referred to as "Sync_Response_From_Leader_Msg." On receiving that message, and at step (7), the target entity decrypts the encrypted package using the private key of its asymmetric key pair. In this manner, the target entity 502 obtains the cryptographic material generated by the leader entity 504.

At step (8), the target entity 502 confirms successful receipt of the cryptographic material by re-generating the fingerprint (this time of its copy of the newly-received material) and sending the conduit entity a "Confirm_Sync_Msg" message that includes the newly-generated fingerprint. At step (9), and upon receipt of that message, the conduit entity 500 compares the fingerprint within the Confirm_Sync_Msg with the fingerprint registered by the leader entity 504. If there is a match, then the target entity is declared a "Synced Follower" and the update has succeeded (for this entity). Otherwise, the synchronization protocol fails and the target entity is marked as an Unsynced Follower. For any Unsynced Follower, the synchronization protocol then restarts from step (1) when a next periodic Fingerprint_Msg is sent to the conduit node.

A process similar to that described above is carried out for any target entity having mismatched fingerprint. Of course, depending on processing and storage capabilities of the conduit entity, these operations can be carried out concurrently for multiple target entities.

The message nomenclature used in the above description is merely exemplary and should not be taken to limit the subject matter of this disclosure. Various messages may be re-used for different type(s) of messages, and a generic request-response messaging format may be used as well. More generally, the periodic fingerprint message may be considered analogous to a "heartbeat," wherein each target entity periodically reports into the conduit with its current state or "status," namely, the fingerprint of its cryptographic material.

The notion of a "fingerprint" being a cryptographic hash also is not intended to be limiting, as other types of identifiers may be used as well. Thus, although perhaps not as secure, an encoding (in lieu of a hash function) may be applied to the cryptographic material, in which case the "fingerprint" represents an encoded version of the cryptographic material.

Recovering from Loss of Leader

Preferably, the conduit entity (node) checks for liveliness of the leader node while processing each Fingerprint_Msg. If the liveliness check for a leader fails, then the conduit entity 500 takes a set of measures to recover and establish a new leader. In particular, the conduit entity removes the failed entity from leader role. Then, if any Synced Followers exist, the conduit entity 500 randomly (or otherwise deterministically, e.g., via a round robin) promotes one Synced Follower entity to become the new leader. This promotion, however, typically does not result in generation of new cryptographic material because the synced followers already contain the same cryptographic material as the newly-promoted leader entity. If, however, no Synced Followers exist, then the conduit entity 500 restarts leader election by sending the "Gen_Crypto_Material_Msg" to the target entities. This results in generation of new cryptographic material by the new leader. The rest of the target entities then undergo the synchronization protocol to obtain copies of this new cryptographic material generated by the new leader, all as previously described.

Recovering from Loss or Corruption of Cryptographic Material

If a Synced Follower loses or corrupts its copy of the cryptographic material, preferably it auto-recovers that material. In particular, and because of the loss/corruption, the fingerprint of cryptographic material that the entity then sends to the conduit entity in its periodic Fingerprint_Msg will not match the registered fingerprint of the leader's cryptographic material. This mismatch then causes the synchronization protocol to kick in, as previously described. In this manner, the entity then re-obtains the cryptographic material from the leader via the conduit entity.

If, however, the leader entity ends up losing or corrupting its copy of the cryptographic material, then the conduit follows the same steps to elect a new leader that are taken during the event of loss of the leader entity. In particular, the conduit entity detects loss or corruption of the leader's cryptographic material when there is mismatch between the fingerprint presented by the leader (to the conduit) in its periodic Fingerprint_Msg, and the fingerprint for the leader registered with the conduit entity. A mismatch may occur, for example, due to this being the first time that an Unsynced Follower came online. In this case, including others, the fingerprints would not match. An initial fingerprint might also be said to have a zero or null value (and would not match).

Cryptographic Key Material Rotation

In some embodiments, the cryptographic material to be shared amongst target entities might be cryptographic key material, such as an ECDSA key pair for asymmetric cryptography. In such embodiments, the technique supports a key rotation functionality initiated by the conduit entity. To this end, the conduit entity sends the leader entity a message, such as "Initiate_Key_Rotation_Msg," to initiate key rotation. Upon receipt of this message, the leader entity rotates cryptographic key material and generates new key material.

Then, preferably the leader sends a message back to the conduit entity confirming key rotation. This message is referred to as "Confirm_Key_Rotation_Msg," and preferably it contains a fingerprint calculated over new key material and the rotated key material. When the conduit entity receives this latter message, preferably the conduit entity updates the fingerprint of cryptographic material registered for the leader entity. This operation results in all the non-leader target entities then using the above-described synchronization protocol to receive a copy of new key material along with rotated key material.

Sharing of Encrypted Messages Among Leader and Follower Entities

A leader and synced followers of the leader are sometimes referred to herein as a synced group. Information is shared, via the conduit, among the leader and followers of a synced group. Each synced group member possesses two sets of asymmetric keys. In some embodiments, a first key is generated for each network entity that later becomes a group member. This first key is generated when that network entity forms a network connection with and registers with the conduit entity. In other words, each network entity that later becomes a synced group member has a first key generated for use with the conduit prior to its becoming a member of the synced group. Thus, each network entity that later becomes a synced group member has a first key generated independently of the later-created shared second key.

As explained above, the second shared key preferably is generated by a network entity that is designated as the leader within a synced group, and preferably the second shared key is synced to other network entities that become followers within the synced group. Preferably, the second key is encrypted by the leader with the follower's first key and is then transmitted via the conduit entity. Further, preferably the communication channel between the conduit and follower, as well as the conduit and the leader, is a mutually-authenticated TLS connection using follower's/leader's first key.

In one embodiment, once a synced group is set up, preferably the conduit entity stores a table (or other data structure) that associates a fingerprint with the leader and all of the followers of a synced group. A message to be shared among synced group members preferably includes metadata that indicates that the messages is directed to the leader. In such case, the conduit uses the metadata in concert with the table to direct messages to other members of the synced group.

More particularly, preferably a synced group member shares a message with the other synced group members by including with the message metadata indicating that the message is addressed to the leader, and then sending the message with the metadata to the conduit. In response to receipt of a message containing metadata indicating the leader as addressee, the conduit sends the message to other members of the synced group. In this manner, a message is sent via the conduit from the leader to all followers, and from an individual follower to the leader and to other followers.

Preferably, each shared message is encrypted using the second key. For example, a shared message is transmitted from a synced group's leader to the conduit over a connection between the leader and the conduit that is encrypted with the leader's first key, and the second key then is transmitted from the conduit to the each of the synced group's followers over individual connections between the conduit and the individual followers that are encrypted with the individual follower's first key.

Alternatively, each shared message is once again encrypted using the second key. For example, a shared message is transmitted from a synced group's leader to the conduit over a connection between the leader and the conduit that is encrypted with the leader's first key, and the message that is encrypted with the second key then is transmitted from the conduit to the each of the synced group's followers (e.g., over mutually-authenticated individual TLS connections between the conduit and the individual followers that are encrypted with the individual follower's first key).

Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

There is no limitation on the type of machine or computing entity that may implement the conduit entity and its related function herein. Any computing entity (system, machine, device, program, process, utility, or the like) may act as the client or the server. The function may be implemented within or in association with other systems, equipment and facilities.

The conduit entity function may be carried out as a "service." The service may be carried out as an adjunct or in association with some other services, such as by a CDN or other such service provider.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The technique herein for cryptographic material sharing may also be used to share other types of data. Thus, more generally the technique may be utilized whenever it is desired for a set of target entities to have given data or information (whether cryptographic or otherwise) via a conduit entity in the manner described above.

The conduit entity may be implemented within a given intermediary system, device, appliance or the like, and as a product or managed service.

A particular implementation of the target entities may be a set of servers located on distinct network segments but that are not directly connected to one another.

In a particular implementation, a conduit entity implements other functionality; thus, the conduit function(s) described herein may comprise part of some other larger function.

Conduit entity functions may themselves be distributed across one or more machines, whether co-located or remote from one another.

The conduit entity includes an associated database or other data store in which information necessary to facilitate the synchronization protocol is stored and managed.

Computing entities that may share cryptographic material according to the above-described protocol can be entities of the same type (e.g., edge server machines in a CDN), or entities that are unrelated. In the former case, these entities do have a trust relationship with one another (because they are part of the same CDN), but they may not have direct network connectivity (except via the intermediary of the conduit, as previously described). Thus, as used herein, entities that share cryptographic material may have a trust relationship, or they may not. The entities may trust each other but not be connected, or they be connected but not trust each other. Any and all such variants may still take advantage of the described protocol.

Thus, there may be many different types of use cases that can take advantage of the cryptographic material sharing protocol described. One use case in the overlay network context in enterprise application access (EAA), which is a SaaS service that delivers access to applications without providing users access to an entire enterprise network. With an EAA service, such as Akamai® Enterprise Application Access, there is no direct path in to enterprise-supported applications; instead, the service dials-out a secure, mutually-authenticated, TLS connection from within the network or cloud and brings the application to the user. In EAA, the entities are sometimes referred to as connectors. In this implementation, the sharing technique herein is used to send encrypted passwords to the EAA connector. Passwords are encrypted in one connector and are sent to the cloud (in which the conduit is supported) and stored in a scratch pad, and are then sent to the same or different connector. Typically, these are the user passwords that are used to log users into an end application such than an application server is not required to ask for the username and passwords, thereby providing a single sign-on experience. This is useful to implement authentication protocols like NTLM. The keys that are used to encrypt the passwords may also be negotiated using this method. These keys are present in the customer premises, and preferably are not seen by the cloud provider.

The above use case merely representative and is not intended to be taken as limiting.

What is claimed is as follows:

1. A method of sharing cryptographic material among a set of computing entities, wherein given computing entities do not share a direct trust relationship or network connectivity with one another, comprising:
    at a conduit entity with which each of the set of computing entities shares a trusted communication path:
        storing an indication that identifies a given one of the computing entities as a leader entity, wherein the cryptographic material to be shared is generated by the leader entity;
        storing a value representing a synchronization state, the value having been generated by the leader entity applying a given function to the cryptographic material;
        receiving a message from a computing entity that is not the leader entity and, in response, determining whether there is loss or corruption of the cryptographic material at the computing entity; and
        when it is determined that there is loss or corruption of the cryptographic material at the computing entity, initiating a synchronization protocol among the computing entity, the conduit entity and the leader entity to auto-recover the cryptographic material from the leader entity to the computing entity via the conduit entity, the conduit entity being restricted from viewing the cryptographic material as the cryptographic material passes through to the computing entity.

2. The method as described in claim 1 wherein determining whether there is loss or corruption of the cryptographic material at the computing entity compares information in the message to the value.

3. The method as described in claim 1 wherein the synchronization protocol comprises:
    receiving at the conduit entity a public key associated with the computing entity;
    forwarding the public key associated with the computing entity to the leader entity;
    receiving from the leader entity a result of the leader entity encrypting the cryptographic material with the public key associated with the computing entity; and
    returning the result to the computing entity.

4. The method as described in claim 3 further including receiving a confirmation message from a target entity, the confirmation message having been generated at the target entity upon (i) the target entity's receipt of the result, and (ii) decrypting of the result using a private key to recover the cryptographic material, wherein the private key and the public key comprise an asymmetric key pair.

5. The method as described in claim 1 wherein the value is a cryptographic hash of the cryptographic material.

6. A computer program product comprising a non-transitory computer readable medium holding computer program instructions, the computer program instructions executed by a hardware processor on a conduit entity, the computer program instructions configured to facilitate sharing of cryptographic material among a set of computing entities by:
    storing an indication that identifies a given one of the computing entities as a leader entity, wherein the cryptographic material to be shared is generated by the leader entity;
    storing a value representing a synchronization state, the value having been generated by the leader entity applying a given function to the cryptographic material;
    receiving a message from a computing entity that is not the leader entity and in response, determining whether there is loss or corruption of the cryptographic material at the computing entity; and
    when it is determined that that there is loss or corruption of the cryptographic material at the computing entity, initiating a synchronization protocol among the computing entity, the conduit entity and the leader entity to auto-recover the cryptographic material from the leader entity to the computing entity via the conduit entity, the conduit entity being restricted from viewing the cryptographic material as the cryptographic material passes through to the computing entity;
    wherein each of a set of computing entities shares a trusted communication path with the conduct entity that executes the synchronization protocol.

7. The computer program product as described in claim 6 wherein determining whether there is loss or corruption of the cryptographic material at the computing entity compares information in the message to the value.

8. The computer program product as described in claim 6 wherein the synchronization protocol comprises:

receiving at the conduit entity a public key associated with the computing entity;

forwarding the public key associated with the computing entity to the leader entity;

receiving from the leader entity a result of the leader entity encrypting the cryptographic material with the public key associated with the computing entity; and returning the result to the computing entity.

9. The computer program product as described in claim 8 further including receiving a confirmation message from a target entity, the confirmation message having been generated at the target entity upon (i) the target entity's receipt of the result, and (ii) decrypting of the result using a private key to recover the cryptographic material, wherein the private key and the public key comprise an asymmetric key pair.

10. The computer program product as described in claim 6 wherein the value is a cryptographic hash of the cryptographic material.

* * * * *